United States Patent [19]

Schott

[11] Patent Number: 5,252,077

[45] Date of Patent: Oct. 12, 1993

[54] PROCESS FOR MATERIALIZING VIRTUAL INTERACTIVITY BETWEEN AN INDIVIDUAL AND A DATA SUPPORT

[75] Inventor: Michel Schott, Vendenheim, France

[73] Assignee: Info Telecom, France

[21] Appl. No.: 771,752

[22] Filed: Oct. 4, 1991

[30] Foreign Application Priority Data

Oct. 4, 1990 [FR] France .................. 90 12463
Apr. 12, 1991 [FR] France .................. 91 04763

[51] Int. Cl.⁵ ............................................ G09B 19/00
[52] U.S. Cl. ..................................................... 434/335
[58] Field of Search .............. 434/335, 317, 322, 323, 434/324, 327, 300–352, 362, 110, 130, 308, 169; 273/16, 232, 256, 278; 364/409, 417

[56] References Cited

U.S. PATENT DOCUMENTS

| | | | |
|---|---|---|---|
| 4,355,984 | 3/1982 | Slavik | 434/335 |
| 4,549,867 | 10/1985 | Dittakavi | 439/337 |
| 4,891,775 | 1/1990 | McWherter | 434/169 X |
| 4,926,255 | 5/1990 | Von Kohorn | 434/323 X |
| 4,946,391 | 8/1990 | Hawkins et al. | 434/308 X |
| 4,959,017 | 9/1990 | Thompson et al. | 434/110 |
| 5,108,115 | 4/1992 | Bernan et al. | 434/130 X |

FOREIGN PATENT DOCUMENTS 2194416 2/1988 United Kingdom .

Primary Examiner—Richard J. Apley
Assistant Examiner—Glenn E. Richman
Attorney, Agent, or Firm—Wall and Roehrig

[57] ABSTRACT

The process permits virtual interaction between a user, and a data support, and generates in an electronic box a sequence of digits arranged according to a pseudorandom logic by the expedient of a pseudorandom generator. The user introduces into the electronic box by the expedient of a data input element a succession of data representative of the user's choices and replies to a test suggesting replies proposed by the data support. The succession of user data is transformed in a succession of digits interpretable in relation to the sequence of digits coming from the generator and the successions thus obtained are interpreted in relation to each other. The process reproduces at the electronic box the result of this comparison in the form of sensory signals.

9 Claims, 1 Drawing Sheet

PROCESS FOR MATERIALIZING VIRTUAL INTERACTIVITY BETWEEN AN INDIVIDUAL AND A DATA SUPPORT

BACKGROUND OF THE INVENTION

1. Field of the Invention

The invention relates to a new process that permits the realization and materialization of virtual interactivity between an individual and a data support, such as for example a television transmission.

2. Description of the Prior Art

By "virtual interactivity" or "pseudo interactivity" is meant according to the invention an apparent, not real, interaction, since it does not result from a physical exchange of information between the two entities between which the exchange occurs.

It is becoming more and more common to find, in the various data supports available to the public, animations that invite the readers, listeners, viewers or televiewers of these data supports to interact with them. To be of some interest, this interaction must be able to judge, to approve and even to correct the answers, results, and other choices of the user during these tests etc. submitted to him. This is especially true in connection with games using as data support a televised or broadcast transmission, in the course of which various tests and other games may be proposed, and where the interest of the interaction resides in obtaining the results of these tests and games.

Now, any real interaction necessarily presupposes two-directional data exchange between the data support and the user, so that, whatever may be the device and means envisaged for arriving at such interaction, the costs of implementation prove consistently to be prohibitive.

Various processes have to date been proposed for permitting the realization of real interaction between the user and the data support, notably in television transmissions. For example, it has been proposed to use a box connected by a cable for transmitting in real time the user's replies to the production center of the transmission.

In the document FR-A-2626731 it has been proposed to realize a virtual interaction between a user and a data support by means of an electronic device able to pick up signals transmitted by a television station which are not decodable or even detectable either visually or auditively by the TV viewer, these signals being intended to remote-load this device with parameters specific for each of the games and other tests proposed within a particular transmission. In fact, a particular coupling is created between the television receiver and the electronic device, which coupling may be of different kinds, namely optical, acoustic, and even electrical. This particular device thus permits the realization of a virtual interaction between the user and the data support since, as the transmission proceeds, the user can, by the expedient of a keyboard integrated in the device, introduce the replies and other choices that are proposed to him, these replies and choices being checked on the spot.

However, this method of interaction proves to be hard to implement, costly and tedious, so that it is difficult to use. In fact, it presupposes the installation of appropriate coding structures, as well as of a receiver and a decoder at the user's box.

SUMMARY OF THE INVENTION

The invention aims to remedy these shortcomings. It proposes a process which permits the realization and materialization of virtual interactivity between a data support and a user. As will be evident more explicitly below, this interaction, apparently real for the user, no longer requires data exchange between him and the data support, so that thereby all the unwieldiness of implementation of such interactivities is removed.

This process for materializing virtual interactivity between a user equipped with an electronic box comprising an electronic circuit and a data input element, on the one hand, and a data support proposing at least one test or query suggesting replies, on the other hand, consists :

in generating at the electronic box a sequence of digits arranged according to a pseudorandom logic by the expedient of a generator integrated in the electronic circuit of the box, this sequence being a function of at least one datum introduced into said generator contained in the electronic circuit, and representative of a succession of data not accessible by the user;

arranging the replies suggested by the test of said data support so as to correlate them directly or indirectly with the digit sequence coming from the generator;

having the user introduce into the box, by the expedient of the data input element, a data succession representative of the user's choices and replies;

transforming this succession of data introduced by the user in the form of a succession of digits interpretable in relation to the sequence of digits coming from the generator;

interpreting the successions thus obtained at the electronic circuit in relation to each other;

and lastly, reproducing, at the box, the result of this interpretation in the form of sensory signals.

In other words, the invention consists in that it permits generating from a small number of data, and via a pseudorandom generator, data—parameters, rules, results—permitting interpretation and judgement of a sequence introduced by the user, the data succession being initialized by a common datum called seeding, on the one hand at all holders of the electronic box, and on the other, at the data support, in order to obtain a uniqueness in the use of this succession.

Thus, knowing the algorithm of pseudo-generation identical for all electronic boxes, it now becomes possible, for the producer of the transmission or the editor of the data support, to provide any possible kind of interaction, their great diversity being a consequence of the quasi-infinity of the seeding of the pseudorandom generator.

According to a characteristic of the invention, the electronic circuit includes a time counting means, generating a time base intended to produce time/date information, capable of undergoing a mathematical treatment so as to constitute a datum introduced in the generator. This counting means is advantageously chosen from among the group consisting of a receiver of broadcast time signals and an internal clock integrated in the electronic box.

To limit the consequences of a time drift, which one cannot get rid of entirely even when using quartz clocks, and which hardly falls below 20 ppm (corresponding to about ten minutes per year), it is advantageous to cut the time/date information into defined intervals of great amplitude. Thus the number of interinterval boundaries is reduced, and hence also the possibilities of their overlapping. In fact, it is seen that when the time/date information constitutes the source of seeding for a given transmission, too great a time drift generates a pseudorandom sequence different from that initially planned by the producer of the transmission, and that the user-transmission interaction becomes falsified. On the other hand, it may happen that the use of a time/date datum as seeding does not allow to put up with a shift in the programming of the transmissions. Therefore, according to an advantageous form of the invention, the defined intervals are chosen centered on the periods of use of the box, that is, during the preset periods of pseudo-interaction. The risks of interference which may arise at the limits of said intervals are thus eliminated.

In a variant of the invention, a possibility is provided to acquire an external datum as co-seeding, introduced by means of the data input element, a receiver of broadcast signals, or a pickup, notably an acoustic one, of electro-magnetic waves, shocks, position, temperature. In this manner, the operation of the box is adapted to the development of at least one test of the data support. Besides, when the seeding of the pseudorandom generator is constituted by a time/date datum valid for a relatively extended period of time, for example one day, this option makes it possible nevertheless to carry out several sequences of interactions during that period. Lastly, the use of an external datum permits to limit, or even abolish, any possibility of diversion of the pseudo-interactivity process. In fact, the ill-intentioned user could introduce a certain number of codes in a totally random manner in order to generate series which he can analyze for the purpose of diverting the transmission support.

In an advantageous form of realization of the process, the external datum is composed of two independent signals:

a first signal consisting of an actual seeding, intended to generate or co-generate with the time/date datum the pseudorandom sequence representative of the parameters of the transmission in question, and a second signal intended to permit the validation of the sequence thus generated and the materialization of the interaction.

This is intended to eliminate all danger of diversion of the process. In fact, this second portion of the signal obeys a known mathematical law of the electronic box, automatically validating the correct code, but systematically rejecting any other code.

In an embodiment of the invention, an external quantifying datum can be introduced at the generator. Its introduction can be carried out by means of a device chosen from among the group comprising the data input element, a radio signal receiver, a pickup, notably acoustic, of electro-magnetic waves, shocks, position, temperature.

This external quantifying datum can thus serve for example in case of postponement of the broadcast to a later date of a pre-recorded transmission. In this case the external datum serves to correct the time/date information before its introduction into the generator, in order to make it coincide with the initial broadcast date.

In another variant of the invention, the external datum does not intervene as co-seeding at the pseudo-random generator, but acts in the interpretation of the sequence of digits coming from said generator. Also, this external datum may act at the level of the interpretation of the succession of data introduced by the user in the electronic box through the expedient of the data input element.

Lastly, this external datum may also act as a synchronization tool to ensure correspondence between the sequencing of events intervening at the level of the data support and a sequencing defined by a sequence of digits coming from the pseudorandom generator. In fact, some applications require synchronization between the actions which take place at the data support and the temporal events governed by the generator of the box.

In such applications, the start of interaction takes place only upon order of a synchronization signal. The effect of this signal is to signal the start of the chronometer inside the box, which becomes the time base on which will be controlled the development of the actions occurring at the level of the data support as well as the temporal events governed by the generator. This procedure ensures perfect synchronism between the behavior of the box and the transmission of the data support.

In a particularly advantageous embodiment of the invention, the synchronization is automatically ensured by the expedient of a signal carried by hertzian means or radio wave and picked up by the electronic box, which is then equipped with an appropriate pickup.

In another embodiment of the invention, the synchronization is ensured by the user, for example through the expedient of a pushbutton associated with the electronic box.

In another embodiment of the invention, the synchronization "pip" is defined by the introduction of the code in the box.

Thus the invention permits getting rid of any malfunction inherent in the time drift of the internal clock which the box may contain, is capable of permitting the realization of a plurality of daily interactions, and this without risk of any piracy or diversion of the process, and also capable of putting up with a drift of the programming of the transmissions, and being able furthermore to permit, when necessary, the synchronized development of a transmission.

BRIEF DESCRIPTION OF THE DRAWINGS

The manner in which the invention can be realized and the advantages deriving from it will become clearer from the example of realization that follows, given in an indicative, not a limiting, sense, with reference to the attached figures.

DESCRIPTION OF THE PREFERRED EMBODIMENT

Figure 1:
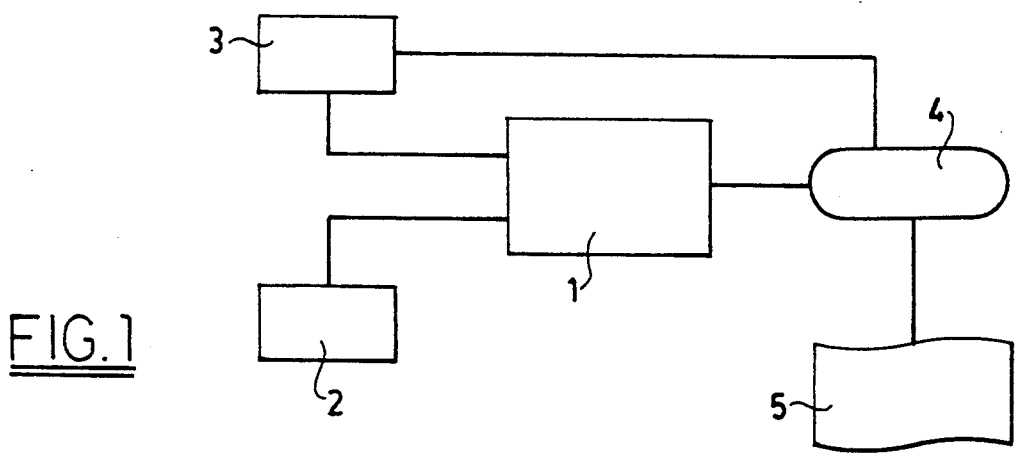
FIG. 1 is a schematic representation of the synopsis of the functioning of the process of the invention.
Figure 2:
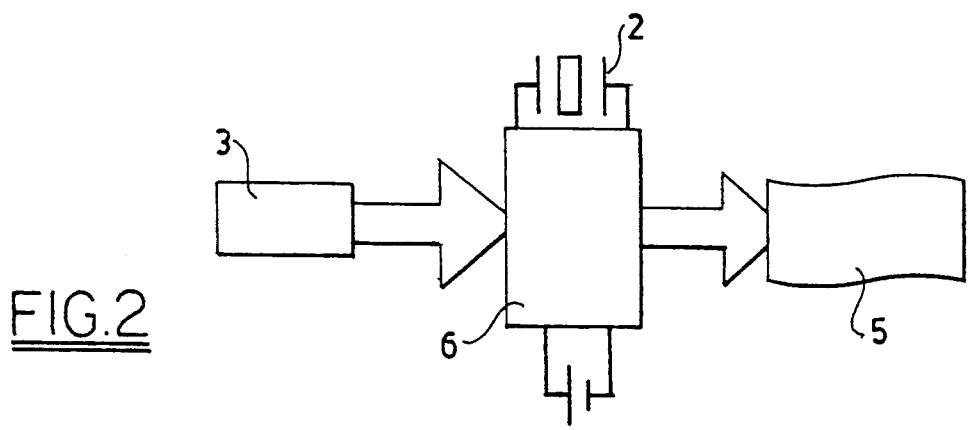
FIG. 2 is a schematic representation of the electronic architecture of the box used in the framework of the invention.

Although described more particularly in connection with a data support constituted by a television transmission, through the expedient of a TV receiver, the invention is not limited to this form of realization alone, and it is understood that any other data support of this type, such as notably a radio transmission, even a telecommunication terminal, etc., is included in the field of application of the invention.

In the framework of the invention, one equips an electronic box intended to be used by a TV viewer, with a microprocessor in which is integrated a function of the generator (1), intended to generate a succession of signals, and notably of digits according to a predetermined sequence. This succession may be periodical. More specifically, this generator generates an algorithm common to all boxes used by the various TV viewers. To obtain a variation in the sequence of digits it is necessary to introduce at the generator (1) an initializing datum, also called seed, which permits the activation of the generator and thus the delivery of a sequence of digits. It is imperative, of course, that for a given seed all generators (1) of one and the same series of devices or boxes deliver the same sequence and notably the same sequence of digits.

This sequence corresponds to a succession of coded data; it is representative of a certain number of elements entering into the functioning of a virtual interactivity, specified at greater length below. This seed may vary in kind, but may consist more specifically of a number, or a digit communicated during the transmission, and for example, appearing on the television screen, or even more subtly a time/date information typically corresponding to the day of the instant of the functioning of the box. This time-dating may be delivered directly by an internal clock (2) integrated in the microprocessor of the electronic box. The clock may be set to a reference clock, of service to the producer of the transmission when creating the different quizzes and tests. Besides, in view of the possible drifts of the clock over a long period of time, it is advantageous to use time intervals of great amplitude, in order to guarantee uniqueness in the pseudorandom generation of the sequence of digits.

When reference is made to a seed introduced by the user, it is introduced by the expedient of a keyboard (3) also integrated in the electronic box.

Thus, the aggregate of the various boxes has a common reference system relative to which comparisons can be made as a function of data subsequently introduced by the user, notably in the course of the television transmissions in the framework of games, tests. etc.

Correlatively, the producer of the transmission also has the same generator, in order to be able to refer to the same reference system common to all electronic boxes. In other words, it suffices for him to set up one or several tests as a function of the replies and other suggestions occurring in the course of the transmission, depending on the pseudorandom sequence generated by said generator of the electronic box.

The sequence of digits is therefore representative of a succession of data not accessible by the user and corresponding to the various questions in the form of parameters, rules and replies of the tests to come during transmission.

The keyboard (3) also serves the user for introducing a succession of data corresponding to the replies to questions and other tests proposed being transmitted. More precisely, the data introduced are typed in clear on said keyboard by the TV viewer and then undergo a transformation at the microprocessor in order to transfer these data in the form of an interpretable succession, for example a succession of the same number as the portion of the succession of pseudorandom digits used. This transformation permits to effect thereafter in a scoring and control section (4) an interpretation (comparison) of the succession of data introduced by the user so as to reproduce the result of the test or quizz, for example on a liquid crystal screen (5) integrated in the box.

Furthermore, it is noted that by modifying the seed of generation of the pseudorandom succession it is possible to obtain a very large number of pseudorandom successions, and hence to increase almost infinitely the number of possibilities of a pseudo-interactivity. It then suffices for the producer of the transmission to adapt the questions and answers as a function for example of the programmed date of the transmission and of the knowledge of the algorithm of the generator.

The TV viewer himself is not aware of this virtual interactivity, since he obtains the results of the tests etc. in which he has either concurrently, or just at end of transmission, depending on the type of game proposed. It is the seed introduced in the generator that defines the series of good results, which will have to be introduced at the time of the transmission, the questions depending, of course, on the transmission producer's knowledge of the seed which will initialize the generator and of the algorithm run by this generator.

This avoids the remote loading of the data, notably of the parameters of the game and other tests of the transmission, which requires, as has been said before, on the one hand, using a system of electrical, optical or acoustic transmission, and on the other hand, generating this coded information at great speed.

Typically, the user electronic box of the invention comprises a microprocessor (6), powered electrically by means for example of button type batteries (10) Correlatively, it receives an internal clock (2) connected to the microprocessor, in order to transfer a time/date information as seed of the generator contained in said microprocessor. The latter is also connected to the keyboard (3), on the one hand, and to the sensory reproduction element (5), notably a liquid crystal screen, on the other hand.

There will be described another example of application of the process of the invention, more particularly intended for written supports. This written support may consist of a weekly proposing to its readers an interaction type game, whose time of validity corresponds to the publication week of this weekly, and which therefore ends the following week (in the edition of which it proposes a new game). The reader has the electronic box already described, the internal clock of which gives the date, and from which the microprocessor extracts the digit corresponding to the day of the week of issue. This digit will be used by the generator of the microprocessor to quantify the correct replies, their number, etc., doing so from the day of appearance of this weekly. The questions or tests are given by the magazine, the reader answering them successively by introducing his replies through the keyboard of the box. At the end of this operational phase, the box transmits the result of this test by the liquid crystal screen, or by the expedient of a word synthesizer. When the next number comes out, that is, the following week, the new seed permits creation of new replies corresponding to the new questions listed in the magazine.

Another application of the process according to the invention will now be described. This application relates to a MCQ (multiple choice questionnaire), the support of which may be televisual. The television transmission proposes to the viewer multiple answer questions based for example on the presentation of a video clip. This example comprises six questions with a range of answers comprised between 1 and 4. The seed initiating the pseudorandom generator, consisting in this case of a shift register, comes from the internal time-date in the user's electronic box.

Figure 3:
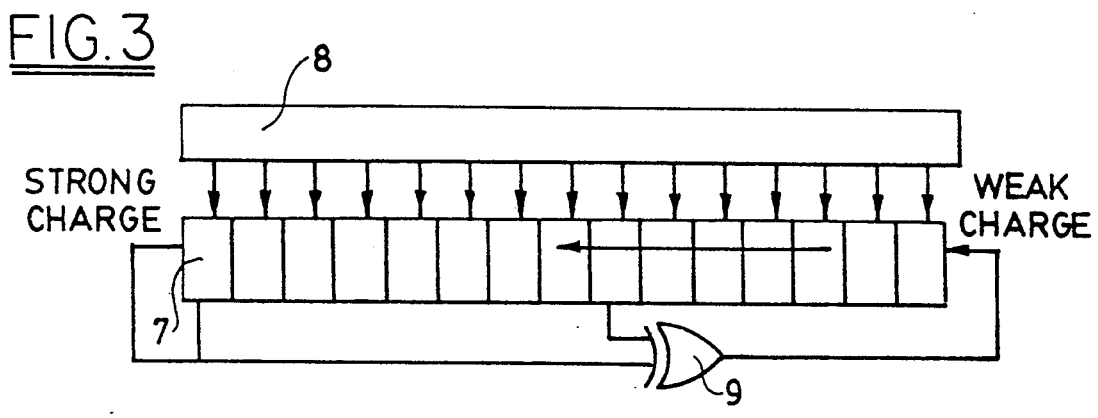
FIG. 3 is a schematic representation of a pseudorandom generator of a special embodiment of the invention.

The shift register is shown by the general reference (7) in FIG. 3. It is realized by means of a wired function, but it is clear that its realization could be obtained by a programmed logic. It is connected to a time/date element (8), and two of its outputs are connected to a logic exclusive OR gate (9), whose output is in turn connected to the input of said register.

The time/date function is introduced in binary coded decimal form by transformation of the day of the year in binary numeration arbitrarily assigning the value of one unit to one full day.

For example, Tuesday Nov. 27, 1990, that is, the 331st day of the year, can be represented in binary form by the number:

| 0   | 3    | 3    | 1    |
|-----|------|------|------|
| 000 | 0011 | 0011 | 0001 |

By loading the above described shift register and making several iteration, one obtains the succession of binary values listed in the table below.

```
0000110011000:10:
0001100110001:01:
0011001100010:11:
0110011000101:10:
1100110001011:00:
1001100010110:01:
```

By assigning the value of the register (or a portion) of each iteration to the replies to the questions of the game, one can then obtain, for a game composed of six MCQ type questions, each of which proposes a range of four possible answers comprised between 1 and the following values:

| Question | 1 | Correct answer: | 3 |
|---|---|---|---|
| | 2 | | 2 |
| | 3 | | 4 |
| | 4 | | 3 |
| | 5 | | 1 |
| | 5 | | 2 |

To do this, one uses for example, in the present case, the low-weight bits, that is corresponding to the two framed columns at right in the above table. Thus one obtains binary values between 0 0 and 1 1, that is, between 0 and 3 which it suffices to increase by one unit to obtain an interval between 1 and 4.

Knowing this result, because of the iterations of the shift register, the preparer of the game needs only to provide for the questions taking into account the results given by the generator.

The TV viewer introduces his own sequence of answers, which will be compared with the reference master sequence, namely 3-2-4-3-1-2, doing so either step by step, and in this case the viewer is informed after each question, in real time, that his reply is right or wrong, by a liquid crystal type display, or in its entirety, at the end of the game, or optionally his score could be displayed to him, again by the expedient of a liquid crystal display unit.

In addition, a response delay for each of the questions may be introduced, to quantify the game, doing so by differently exploiting the succession of binary values determined by the shift register.

According to a first variant of the invention, the time/date seed introduced into the generator is associated with a seed introduced by the user in coded form. The time/date datum, for example the day, induces at the generator (1), as in the previous case, a pseudorandom sequence of digits, according to an algorithm common to all electronic boxes and known by the producer of the television transmission. The producer, knowing also the initializing seed, here the day of programming the transmission, is able to realize any type of games, tests, etc., which will be valid only during that day.

Besides, at the time of starting the transmission in question, the presenter indicates a specific code to be introduced in the box, by the expedient of the keyboard, intended to be compared internally to the codes of the possible transmissions designated for the day in question and defined by the pseudorandom sequence generated by the time/date datum. Thus, if a correspondence can be detected, the transmission can proceed with the interactive feature. In the absence of correspondence, on the other hand, the user is permitted a given number of attempts, at the end of which he is infallibly rejected for a given duration.

Since the generation of the specific codes of transmissions for a period considered, namely for one day, are [sic] indexed on the time/date datum, they vary every day. Thus it becomes particularly difficult to divert the interaction process.

In another particularly advantageous form of the invention, the code introduced by the user upon the presenter's proposal comprises in turn two points of information:

a first information is associated with the time/date datum, so as to induce at the box the generation of a pseudorandom sequence corresponding not only to specific transmissions, but also to the quantification of the characteristics of a well defined transmission;

a second information corresponding, as in the preceding case, to an electronic key, intended to verify the validity of the code, for example by means of a known mathematical law of the box.

In this manner one optimizes the number of possibilities of interactions during one and the same period of validity of a basic pseudorandom sequence.

In applications which require a rigorous, or even perfect synchronism between the behavior of the box and the transmission of the data support, according to one of the features of the invention an element able to ensure this synchronization is associated with the box.

This synchronization element may consist of a simple pushbutton integrated in the electronic box, actuated by the user at the time indicated by the animator, for example of the television transmission.

In another embodiment of the invention, this synchmoization pip is automatically transmitted to the box by means of a carrier wave, and typically a hertzian signal, a radio wave, or even a luminous or sonic signal. This electronic box is then equipped with an appropriate receiver, able to transmit the synchronization pip to the electronic circuit. In a variant, the box, equipped with a microphone, is able to recognize a melody or "jingle" preceding the transmission. Also the transmission of this pip in the form of an electric signal carried by the TV signal could be conceived, the box being then electrically connected to the television receiver.

This synchronization "pip" may furthermore be formed by the simple introduction of the code by the user by means of the keyboard (3).

This synchronization being obtained, the origin time $t_o$ of the start of the interactivity is thus fixed. The game or test (or the like) can now begin, the user using the keyboard (3) as data input element, that is, as element for introducing the responses which are submitted to him [sic]. More precisely, the introduced data are typed in clear on the keyboard by the TV viewer, then undergo a transformation in the microcomputer in order to transfer these data in the form of an interpretable succession, for example a succession of digits of the same number as the portion of the periodic succession used. In other words, this transformation then makes it possible to perform in a scoring and control section (4) an interpretation (comparison) of the data succession introduced by the user so as to reproduce the result of the test or quizz, for example at a liquid crystal screen (5) integrated in the box. This reproduction can then occur in real time, directly, without having to resort to a real interactivity between the television transmission and the user's box.

In the following, a practical example of an application of the process according to the invention will be described.

A TV viewer has a whistle making up the electronic circuit described before. In other words, the electronic box consists of the whistle itself. A film passes over the television receiver, showing a motorist driving through a crowd and committing crimes. The viewer is invited to point out each of these crimes by whistling. This action of whistling, besides the purely sensory aspect, generates an input signal interpreted by the electronic circuit as a datum introduced by the viewer, and intended to be compared with the pseudorandom succession generated, for example, as a result of a synchronization pip following the introduction in the box of the validation code of the pseudorandom sequence by the user. If he whistles correctly, it can be envisaged to associate with the whistle a liquid crystal screen which materializes the correct whistle blows. It can also be envisaged to materialize at the end of the game the survey of the various responses made by the viewer.

The different intervals of time separating two successive responses are preliminarily provided for by the pseudorandom generation and used by the producer of the transmission.

The external datum can also be used to modify the interpretation of the data introduced by the user. For example, in the framework of the game, the player must reach a value determined by the generator. He enters in the box a limited series of numbers, which undergoes a certain mathematical treatment, for example an addition, the result of which is compared with the specific value to be reached. In a developed version of this application, the generator generates also a bracket within which the result of the treatment must fall to win, so that the player can be informed of his score as soon as the game ends. In addition, this type of game can be coupled with a central server, where the scores of the various players are recorded, so as to establish a hierarchy, and hence a winner.

It is noted therefore that the process according to the invention permits achieving a virtual interactivity, the implementation of which is simplified because of the systematic synchronization which one can provide for.

This process is therefore particularly adapted to all interactive systems, and more particularly to such systems in which the interaction support consists of a televised or radio transmission.

I claim:

1. A method of virtual interactive communication with a data support that proposes at least one query to a user, comprising the steps of:

seeding a pseudorandom number generator with at least one datum to generate a sequence of digits according to a logic that is inaccessible to the user;

suggesting at least one reply to said query;

introducing data to an electronic circuit means with a data input device, said introduced data being representative of the user's reply to said query, and being associated with predetermined members of said generated sequence;

transforming said introduced data in said electronic circuit means to yield a transformed sequence that is comparable to said generated sequence;

comparing said transformed sequence with said generated sequence; and outputting a signal that is indicative of said comparison to a display.

2. The method according to claim 1, wherein said electronic circuit means comprises a time counting means for generating a time base datum, and said step of seeding is performed by the steps of transforming said time base datum and submitting said transformed time base datum to said pseudorandom number generator, said time counting means being selected from the group of a receiver of broadcast time signals and an internal clock.

3. The method according to claim 2, wherein said time base datum comprises a time interval having a predetermined length, whereby errors resulting from time drift are limited.

4. The method according to claim 3, wherein said time interval is centered on a period of expected use of said electronic circuit means.

5. The method according to claim 1, wherein said step of seeding is performed with an external co-seeding datum that is introduced to said pseudorandom number generator by a device selected from the group comprising said data input device, a receiver of broadcast signals, and a pickup of a characteristic selected from the group of acoustic energy, electromagnetic waves, shocks, position, and temperature.

6. The method according to claim 1, wherein said step of seeding further comprises the step of introducing an external quantifying datum to said pseudorandom number generator by a device selected form the group comprising said data input device, a receiver of broadcast signals, and a pickup of a characteristic selected from the group of acoustic energy, electromagnetic waves, shocks, position, and temperature.

7. The method according to claim 1, further comprising the steps of introducing an external datum to said electronic circuit means and transforming said generated sequence with said external datum therein prior to said step of comparing, said external datum being introduced by a device selected from the group comprising said data input device, a receiver of broadcast signals, and a pickup of a characteristic selected from the group of acoustic energy, electromagnetic waves, shocks, position, and temperature.

8. The method according to claim 1, further comprising the steps of introducing an external datum to said electronic circuit means and transforming said introduced data with said external datum therein prior to said step of comparing, said external datum being introduced by a device selected from the group comprising said data input device, a receiver of broadcast signals, and a pickup of a characteristic selected from the group of acoustic energy, electromagnetic waves, shocks, position, and temperature.

9. The method according to claim 1, further comprising the step of introducing a synchronizing datum to said electronic circuit means in order to coordinate said pseudorandom number generator and electronic circuit means with temporal events occurring in said data support, said synchronizing datum being introduced by a device selected from the group comprising said data input device, a receiver of broadcast signals, and a pickup of a characteristic selected from the group of acoustic energy, electromagnetic waves, shocks, position, and temperature.

* * * * *